United States Patent
Dana et al.

(10) Patent No.: US 11,980,843 B1
(45) Date of Patent: May 14, 2024

(54) REGENERATION AND CO2 RECOVERY SYSTEM FOR CLOSED LOOP BLOOD OXYGENATOR

(71) Applicant: KING FAISAL UNIVERSITY, Al-Ahsa (SA)

(72) Inventors: Enshira Dana, Al-Ahsa (SA); Amna Shahzad, Al-Ahsa (SA); Njood Abdulaziz Al Ali, Al-Ahsa (SA); Maysam Alsheheb, Al-Ahsa (SA); Reem Ammar, Al-Ahsa (SA); Hadeel Yaser Boshajea, Al-Ahsa (SA); Waad Waled Alnaweh, Al-Ahsa (SA); Wejdan Yasser Alolaiwy, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/387,750

(22) Filed: Nov. 7, 2023

(51) Int. Cl.
*B01D 53/02* (2006.01)
*B01D 53/08* (2006.01)
*B01D 53/62* (2006.01)

(52) U.S. Cl.
CPC ............. *B01D 53/08* (2013.01); *B01D 53/62* (2013.01); *B01D 2257/504* (2013.01); *B01D 2259/402* (2013.01)

(58) Field of Classification Search
CPC .. B01D 53/08; B01D 53/62; B01D 2257/504; B01D 2259/402
See application file for complete search history.

(56) References Cited

U.S. PATENT DOCUMENTS

| | | | |
|---|---|---|---|
| 3,865,924 A | 2/1975 | Gidaspow et al. | |
| 6,176,897 B1 * | 1/2001 | Keefer | B01D 53/0476 96/144 |
| 6,521,026 B1 * | 2/2003 | Goto | B01D 53/06 96/125 |
| 6,596,248 B2 * | 7/2003 | Schimkat | B01D 53/06 423/220 |
| 6,780,227 B2 * | 8/2004 | DuBose | H01M 8/0662 96/125 |

(Continued)

OTHER PUBLICATIONS

Williams, Ndifreke Etuk, Oluwasuyi Ayobami Oba, and Nur Pasaoglulari Aydinlik. "Modification, Production, and Methods of KOH-Activated Carbon." ChemBioEng Reviews 9.2 (2022): 164-189.

(Continued)

*Primary Examiner* — Christopher P Jones
(74) *Attorney, Agent, or Firm* — Nath, Goldberg & Meyer; Richard C. Litman

(57) ABSTRACT

A regeneration and $CO_2$ recovery system for a closed loop blood oxygenator includes a rotary cylinder having an input, a first output and a second output. A plurality of columns are located within the rotary cylinder. The input flows through a first column of the plurality of columns to the first output. A $CO_2$ adsorbent is located in each of the plurality of columns. A heater is located adjacent a second column of the plurality of columns. The second column allows gas flow to the second output. The rotary cylinder rotates the first column to the second output when adsorbent in the first column is saturated. The heater heats the first column to release the $CO_2$ through the second output.

14 Claims, 4 Drawing Sheets

(56) References Cited

U.S. PATENT DOCUMENTS

| | | | |
|---|---|---|---|
| 6,783,738 B1* | 8/2004 | Sasaki | B01D 53/62 |
| | | | 422/177 |
| 7,449,054 B2* | 11/2008 | Rabellino | B01D 53/75 |
| | | | 96/128 |
| 7,914,479 B2 | 3/2011 | Monzyk et al. | |
| 8,974,576 B2* | 3/2015 | Gupta | B01D 53/0462 |
| | | | 95/139 |
| 9,504,955 B2 | 11/2016 | Elliot et al. | |
| 10,406,475 B2* | 9/2019 | Okano | B01D 53/06 |
| 10,413,655 B2 | 9/2019 | Wu et al. | |
| 11,872,517 B2* | 1/2024 | Zhang | B01D 53/0438 |
| 2002/0083833 A1* | 7/2002 | Nalette | B01J 20/3208 |
| | | | 95/139 |
| 2011/0189075 A1* | 8/2011 | Wright | B01D 53/62 |
| | | | 502/55 |
| 2015/0007725 A1* | 1/2015 | Elliott | B01D 53/83 |
| | | | 96/125 |
| 2015/0273385 A1* | 10/2015 | Eisenberger | B01D 53/08 |
| | | | 95/107 |
| 2016/0184772 A1* | 6/2016 | White | B01D 63/02 |
| | | | 96/10 |
| 2023/0201757 A1* | 6/2023 | Alissa | B01D 53/0438 |
| 2023/0357481 A1* | 11/2023 | Testud | C08F 293/00 |
| 2024/0032485 A1* | 2/2024 | Ball | H05B 47/105 |

OTHER PUBLICATIONS

Wang, Junya, et al. "Activated carbon-based composites for capturing CO2: a review." Greenhouse Gases: Science and Technology 11.2 (2021): 377-393.

\* cited by examiner

| CO₂ ADSORBENT/ CRITERIA | ADSORPTION CAPACITY | REGENERATION | TOXICITY | AVAILABILITY | COST |
|---|---|---|---|---|---|
| KOH-MODIFIED AC | AT 25°C, 1 BAR (1.9 mol/Kg) | CAN BE REGENERATED | SAFE | AVAILABLE | 5 SR/Kg |
| MOFS-74 | AT 25°C, 1 BAR (5 mol/Kg) | CAN BE REGENERATED | SAFE | NOT AVAILABLE | 5000 SR/Kg |
| ZEOLITE- (ZSM-5) | AT 25°C, 1 BAR (0.832 mol/Kg) | CAN BE REGENERATED BUT WITH A LOSS OF MATERIAL PROPERTIES | SAFE | AVAILABLE | 18 SR/Kg |
| SODA LIME | (10.3 mol/Kg) | CANNOT BE REGENERATED (REPLACED EVERY 6-10 HOURS) | SAFE | AVAILABLE | 5.64 SR/Kg |

FIG. 4

REGENERATION AND CO2 RECOVERY SYSTEM FOR CLOSED LOOP BLOOD OXYGENATOR

BACKGROUND

1. Field

The present disclosure relates to oxygenators, and particularly to a regeneration and $CO_2$ recovery system for oxygenators.

2. Description of the Related Art

For patients with life-threatening heart/lung diseases, deoxygenated blood can be oxygenated by an oxygenator. However, in conventional open loop oxygenators, 70% of medical $O_2$ is wasted without being used.

SUMMARY

Open-loop blood oxygenators have very low efficiency in terms of $O_2$ usage. A closed-loop blood oxygenator includes a regenerator that minimizes the amount of $O_2$ needed and reduce long term costs.

The regenerator receives gas from the oxygenator. The gas flows through a cylinder containing activated carbon (AC) to filter $CO_2$ from the gas. The left over $O_2$ is reused and cycled back to the oxygenator through the cylinder. To keep the level of $CO_2$ within an acceptable range inside the system, the AC is thermally regenerated thereby releasing the $CO_2$ which is then stored.

The closed loop blood oxygenator includes a built-in thermal regenerator used on a saturated adsorbent within the cylinder. Released $CO_2$ is stored and the efficiency of the system is increased by reusing unused $O_2$. This system is more eco-friendly because it captures released $CO_2$ and generates profit by selling the stored $CO_2$.

A regeneration and $CO_2$ recovery system for a closed loop blood oxygenator, in one embodiment, includes a rotary cylinder having an input, a first output and a second output. A plurality of columns are located within the rotary cylinder. The input flows through a first column of the plurality of columns to the first output. A $CO_2$ adsorbent is located in each of the plurality of columns. A heater is located adjacent a second column of the plurality of columns. The second column allows gas flow to the second output. The rotary cylinder rotates the first column to the second output when adsorbent in the first column is saturated and the heater heats the first column to release the $CO_2$ through the second output.

A sensor, such as a $CO_2$ sensor, can be used to determine when the adsorbent in the first column is saturated.

An oxygenator, in some embodiments, is connected to the input and the first output.

An $O_2$ supply is connected to the first output through a valve. A control unit maintains the oxygen level at 200 mmHg.

A vacuum pump is connected to the second output and moves released $CO_2$ into a storage tank connected to the second output.

The adsorbent can be an MOFs or a KOH-Modified AC.

A regeneration and $CO_2$ recovery method for a closed loop blood oxygenator includes receiving gas through an input to a first column of a rotary cylinder having a first output and a second output; adsorbing $CO_2$ through an adsorbent located in the first column and allowing $O_2$ to pass through the first column to the first output; exhausting $O_2$ through the first output; rotating the first column to the second output when the adsorbent is fully saturated with $CO_2$; heating the first column at the second output with a heater located adjacent to the second output; and releasing $CO_2$ from the first column to the second output.

The method further includes using a sensor to determine when the adsorbent in the first column is saturated.

The method further includes supplying $O_2$ to an oxygenator through the first output and receiving gas from the oxygenator through the input.

$O_2$ is supplied from an $O_2$ supply connected to the first output through a valve.

The oxygen level is maintained at 200 mmHg using a control unit.

The released $CO_2$ is moved into a storage tank connected to the second output using a vacuum pump.

These and other features of the present subject matter will become readily apparent upon further review of the following specification.

BRIEF DESCRIPTION OF THE DRAWINGS

FIG. 4 is a table of adsorbent materials showing an evaluation of their properties.

Similar reference characters denote corresponding features consistently throughout the attached drawings.

DETAILED DESCRIPTION OF THE PREFERRED EMBODIMENTS

A high-efficiency closed-loop blood oxygenator includes a regenerator designed with columns using activated carbon (AC) as a $CO_2$ adsorbent. The AC is thermally regenerated, thereby releasing the $CO_2$ which is then stored and sold. Storing $CO_2$ helps to reduce greenhouse effects and, in some embodiments, it is expected that around SR 30-45 worth of $CO_2$ can be stored per hour, making this an eco-friendly and profitable design. Unused $O_2$ can then be reused.

Overall, the amount of $O_2$ needed is reduced since the system reuses unused $O_2$, operating costs in the long term are reduced, and the environment is protected by storing released $CO_2$.

Figure 1:
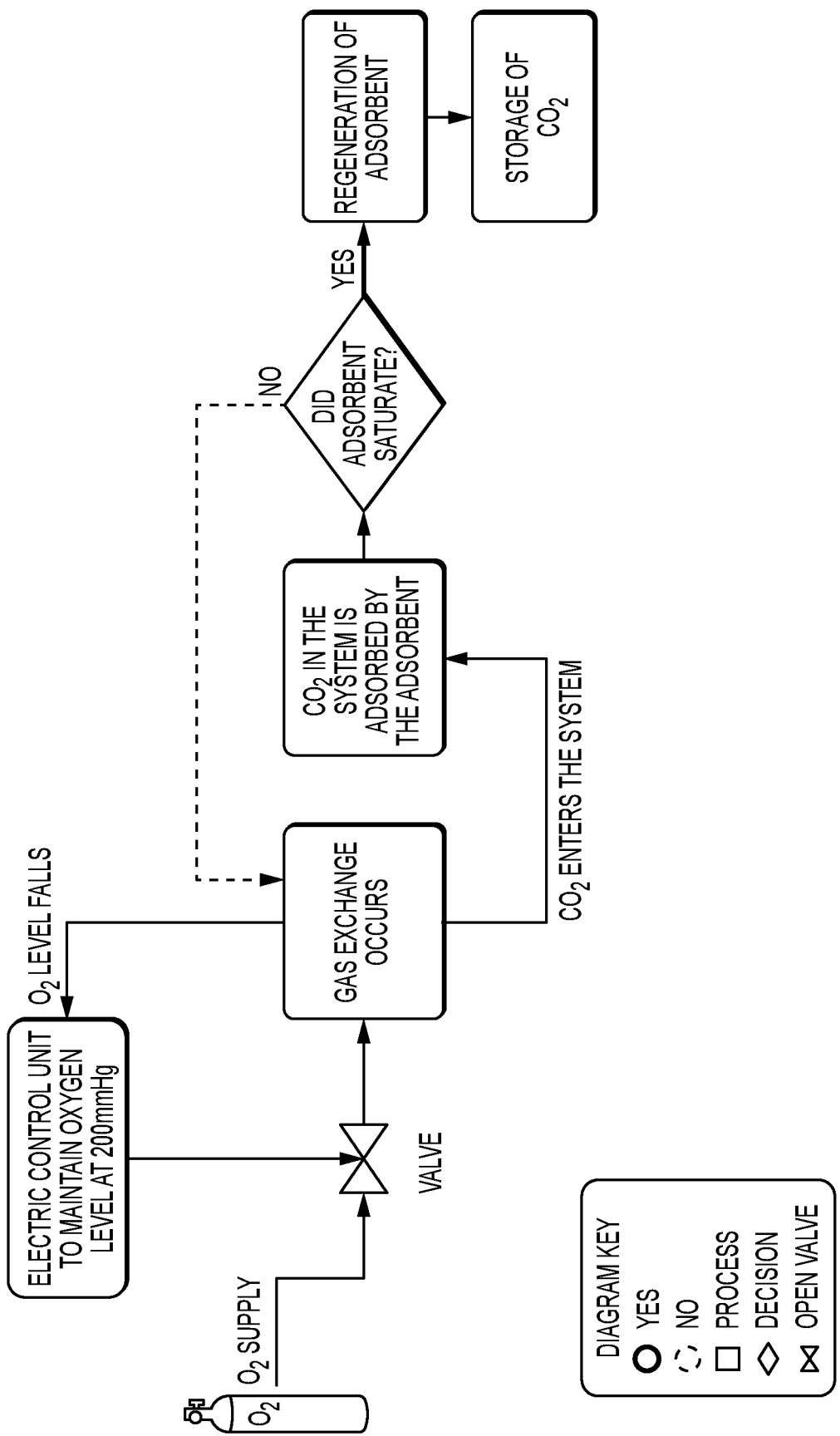
FIG. 1 is a flow diagram illustrating the process of a closed-loop blood oxygenator regeneration and $CO_2$ recovery system.

FIG. 1 is a flow diagram illustrating the process of a closed-loop blood oxygenator regeneration and $CO_2$ recovery system. $O_2$ is supplied to the system through a valve controlled by a control unit (i.e. electronic control unit) to maintain an oxygen level of 200 mmHg. Gas exchange occurs between blood and gas through a membrane by diffusion due to a concentration gradient. $CO_2$ in the system is adsorbed by an adsorbent until the adsorbent is saturated (6 mmHg in some embodiments). A $CO_2$ sensor can be used to determine when the adsorbent is fully saturated, and when it is determined that the adsorbent is fully saturated, the adsorbent is thermally regenerated. In some embodiments, a heating element is used to heat the adsorbent to around 60 degrees C., releasing the $CO_2$ from the adsorbent. The released $CO_2$ is then captured and stored. A vacuum pump can be used to capture and move the released $CO_2$ into a storage tank.

Figure 2:
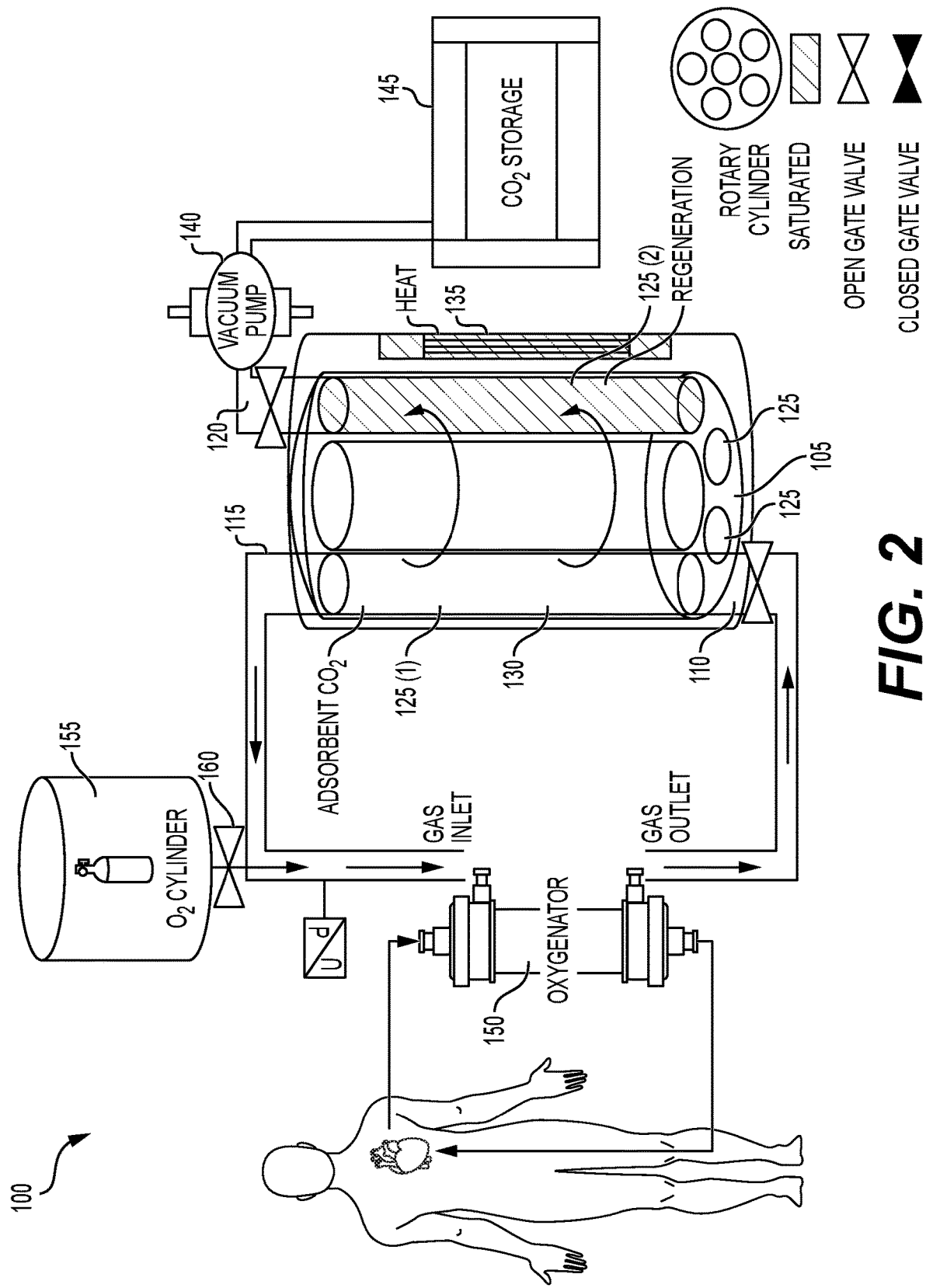
FIG. 2 is an illustration of a closed-loop blood oxygenator regeneration and $CO_2$ recovery system.

FIG. 2 is an illustration of a closed-loop blood oxygenator regeneration and $CO_2$ recovery system 100. A rotary cylinder 105 has an input 110, a first output 115 and a second output 120. A plurality of columns 125 are located within the rotary cylinder 105. The input 110 flows through a first column 125(1) of the plurality of columns to the first output 115. A $CO_2$ adsorbent 130 is located in each of the plurality of columns 125. A heater 135 is located adjacent a second column 125(2) of the plurality of columns 125. Gas from the second column 125(2) flows to the second output 120. The rotary cylinder 105 rotates the first column 125(1) to the second output 120 when adsorbent in the first column 125(1) is saturated. The heater 135 heats the first column 125(1) to release $CO_2$ through the second output 120. A vacuum pump 140 is connected to the second output 120 and moves the released $CO_2$ into a storage container 145.

The cycle continues until the adsorbent 130 is fully saturated, and $CO_2$ will not be further adsorbed by the adsorbent 130. A $CO_2$ sensor detects the level of $CO_2$ in the gas or adsorbent. When the $CO_2$ level reaches 6 mmHg, the column switches. A new column with fresh adsorbent allows adsorption to continue.

The saturated adsorbent 130 is then thermally regenerated. When the adsorbent 130 is heated by the heater 135 (e.g. heating element) to around 60° C., $CO_2$ is released. The vacuum pump 140 moves $CO_2$ and stores it in the storage container 145 (storage tank). To prevent leakage of $CO_2$ during transfer to the tank, it has a valve at its opening. This valve is closed during the rotation of the column. Once the columns stop moving, the valve opens to allow $CO_2$ to move from the column to the tank during the regeneration process.

An oxygenator 150 is connected to the input 110 and the first output 115.

An $O_2$ supply 155 is connected to the first output 115 through a valve 160.

Gas exchange occurs between blood and gas through a membrane by diffusion. $CO_2$ and $O_2$ flow through a pipe 160 and enter the rotatory cylinder 105 that contains our adsorbent 130. $CO_2$ is adsorbed by the adsorbent 130 and $O_2$ is reused by flowing through first output 115 back to the oxygenator 150.

Figure 3C:
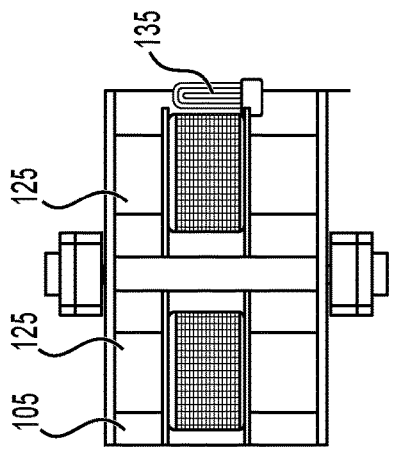
FIG. 3C is a top view of the inside of the rotary cylinder.
Figure 3B:
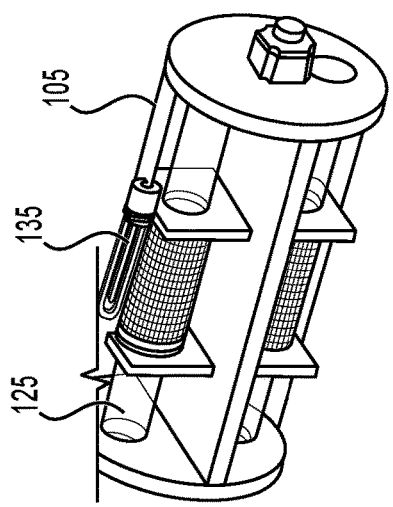
FIG. 3B is an inner view of a rotary cylinder.
Figure 3D:
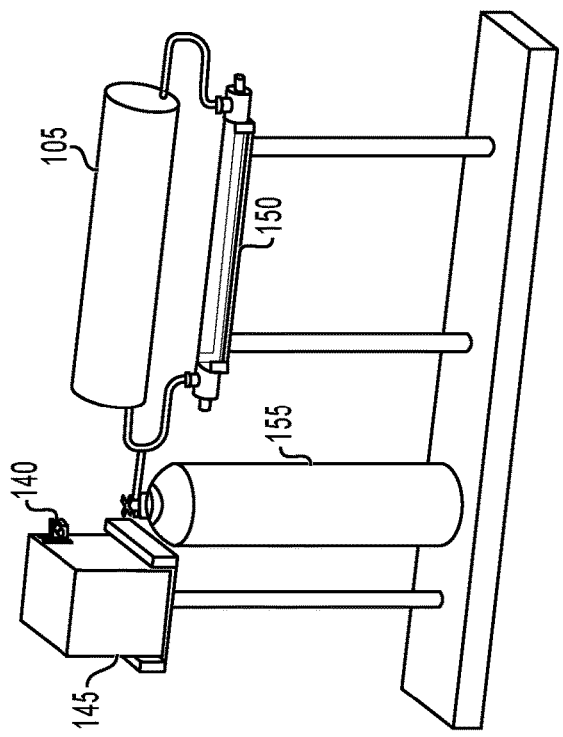
FIG. 3D is a perspective view of the closed-loop blood oxygenator regeneration and $CO_2$ recovery system.
Figure 3A:
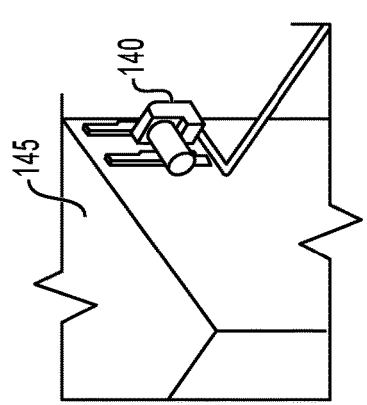
FIG. 3A is an illustration of a vacuum pump and storage container.

FIG. 3A is an illustration of the vacuum pump 140 and storage container 145. FIG. 3B is an inner view of the rotary cylinder 105 and FIG. 3C is a top view of the inside of the rotary cylinder 105. FIG. 3D is a perspective view of the closed-loop blood oxygenator regeneration and $CO_2$ recovery system 100.

FIG. 4 is a table of adsorbent materials showing an evaluation of their properties. Although using soda lime is the most popular $CO_2$ absorbent, it has many drawbacks. For example, to signal the saturation of soda lime indicators are used. It is suspected that these indicators release harmful compounds. In addition, soda lime dust inhalation also causes airway diseases. Therefore, it is suggested to use other materials to remove $CO_2$, although soda lime could be used.

Temperature swing adsorption is chosen because it can be done using heating element that heats up to 60° C. The regenerated adsorbent can be reused many times. During the process of regeneration, $CO_2$ is absorbed by the adsorbent.

One option is to use metal-organic frameworks (MOFs) that have much higher adsorption capacity and is also regeneratable. MOFs are, however, very expensive and not always readily available. KOH-Modified AC is the next best option due to low cost and high availability (can be locally prepared from agricultural waste such as date seeds, which is currently done at the center of research center at King Faisal University in Saudi Arabia).

It is to be understood that the present invention is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A regeneration and $CO_2$ recovery system for a closed loop blood oxygenator, comprising:
   a rotary cylinder having an input, a first output and a second output;
   a plurality of columns located within the rotary cylinder, wherein the input flows through a first column of the plurality of columns to the first output;
   a $CO_2$ adsorbent located in each of the plurality of columns; and
   a heater located adjacent a second column of the plurality of columns, the second column allowing gas flow to the second output;
   wherein the rotary cylinder rotates the first column to the second output when adsorbent in the first column is saturated and the heater heats the first column to release the $CO_2$ through the second output, and wherein the oxygenator is connected to the input and the first output.

2. The regeneration and $CO_2$ recovery system for a closed loop blood oxygenator as recited in claim 1, further comprising a sensor to determine when the adsorbent in the first column is saturated.

3. The regeneration and $CO_2$ recovery system for a closed loop blood oxygenator as recited in claim 1, further comprising an $O_2$ supply connected to the first output through a valve.

4. The regeneration and $CO_2$ recovery system for a closed loop blood oxygenator as recited in claim 3, further comprising a control unit that maintains the oxygen level at 200 mmHg.

5. The regeneration and $CO_2$ recovery system for a closed loop blood oxygenator as recited in claim 1, further comprising a vacuum pump connected to the second output.

6. The regeneration and $CO_2$ recovery system for a closed loop blood oxygenator as recited in claim 5, further comprising a storage tank connected to the second output, wherein the vacuum pump sucks the released $CO_2$ into the storage tank.

7. The regeneration and $CO_2$ recovery system for a closed loop blood oxygenator as recited in claim 1, wherein the adsorbent is a MOF.

8. The regeneration and $CO_2$ recovery system for a closed loop blood oxygenator as recited in claim 1, wherein the adsorbent is a KOH-Modified AC.

9. A regeneration and $CO_2$ recovery method for a closed loop blood oxygenator, comprising:
   receiving gas through an input to a first column of a rotary cylinder having a first output and a second output;
   adsorbing $CO_2$ through an adsorbent located in the first column and allowing $O_2$ to pass through the first column to the first output;
   exhausting $O_2$ through the first output;

rotating the first column to the second output when the adsorbent is fully saturated with $CO_2$;

heating the first column at the second output with a heater located adjacent to the second output; and releasing $CO_2$ from the first column to the second output, wherein the oxygenator is connected to the input and the first output.

10. The regeneration and $CO_2$ recovery method for a closed loop blood oxygenator as recited in claim 9, further comprising further comprising determining when the adsorbent in the first column is saturated using a sensor.

11. The regeneration and $CO_2$ recovery method for a closed loop blood oxygenator as recited in claim 9, further comprising supplying $O_2$ to the oxygenator through the first output and receiving gas from the oxygenator through the input.

12. The regeneration and $CO_2$ recovery method for a closed loop blood oxygenator as recited in claim 9, further comprising supplying $O_2$ from an $O_2$ supply connected to the first output through a valve.

13. The regeneration and $CO_2$ recovery method for a closed loop blood oxygenator as recited in claim 12, further comprising maintaining the oxygen level at 200 mmHg using a control unit.

14. The regeneration and $CO_2$ recovery method for a closed loop blood oxygenator as recited in claim 9, further comprising sucking the released $CO_2$ to a storage tank connected to the second output using a vacuum pump.

\* \* \* \* \*